United States Patent
Potter et al.

(10) Patent No.: US 6,526,964 B1
(45) Date of Patent: Mar. 4, 2003

(54) DIRECT GAS-FIRED BURNER ASSEMBLY

(75) Inventors: Gary J. Potter, St. Charles, MO (US); James R. Jones, St. Louis, MO (US)

(73) Assignee: Cambridge Engineering, Inc., Chesterfield, MO (US)

( * ) Notice: Subject to any disclaimer, the term of this patent is extended or adjusted under 35 U.S.C. 154(b) by 0 days.

(21) Appl. No.: 09/574,427

(22) Filed: May 19, 2000

Related U.S. Application Data

(60) Provisional application No. 60/135,142, filed on May 20, 1999.

(51) Int. Cl.[7] .................. F23D 14/08; F23D 14/70; F23D 14/78; F24H 1/00
(52) U.S. Cl. .............. 126/110 C; 126/110 B; 126/116 R; 431/354; 431/351; 431/10; 432/222
(58) Field of Search ................ 431/350, 352, 431/353, 10; 432/222; 126/110 B, 110 C, 116 R

(56) References Cited

U.S. PATENT DOCUMENTS

| | | | |
|---|---|---|---|
| 2,518,021 A | | 8/1950 | Keay |
| 3,051,464 A | * | 8/1962 | Yeo et al. |
| 3,055,145 A | | 9/1962 | Lindsay |
| 3,178,161 A | * | 4/1965 | Yeo et al. |
| RE26,244 E | * | 8/1967 | Spielman |
| 3,485,043 A | | 12/1969 | Ehrich |
| 3,486,043 A | | 12/1969 | Ehrich |
| 3,494,711 A | * | 2/1970 | Spielman |
| 3,630,499 A | | 12/1971 | Kramer, Jr. |
| 3,885,919 A | | 5/1975 | Pillard |
| 3,993,449 A | | 11/1976 | Childs |
| 4,523,905 A | | 6/1985 | Lewis |
| 4,573,907 A | | 3/1986 | Coppin et al. |
| 4,610,626 A | | 9/1986 | Kikutani et al. |
| 4,651,711 A | | 3/1987 | Velie |
| 4,674,475 A | | 6/1987 | Powis |
| 4,869,665 A | | 9/1989 | Coppin |
| 4,929,541 A | | 5/1990 | Potter et al. |
| 4,993,944 A | | 2/1991 | Potter et al. |
| 5,083,918 A | | 1/1992 | Potter et al. |
| 5,399,086 A | | 3/1995 | Potter et al. |

FOREIGN PATENT DOCUMENTS

| | | | |
|---|---|---|---|
| CA | 560916 | 7/1958 | |
| JP | 9-222209 | * 8/1997 | ............... 431/352 |

* cited by examiner

*Primary Examiner*—Carl D. Price
(74) *Attorney, Agent, or Firm*—Paul M Denk

(57) ABSTRACT

A gas burner assembly, including its gas intake manifold, in combination with upper and lower tiered baffles, and includes the side chambers for regulation of flow if air through a draw in and through type of burner assembly, to provide heated air for a building. Various slots are provided in both the side chambers, and are custom designed for application to select tiers of the upper and lower baffles, to precisely regulate the flow of air into the combustion chamber, and regulate the type of flame generated, to furnish very precise generation of heat, and BTU output for the various sized burner assemblies.

9 Claims, 9 Drawing Sheets

| ITEM NO. | QTY. | PART NO. | DESCRIPTION | GUAGE |
|---|---|---|---|---|
| 1 | 1 | 7050-172 | REAR MANIFOLD (6") | 14 ga CRS |
| 2 | 1 | 7050-170 | FRONT MANIFOLD, NG (6") | 14 ga CRS |
| 3 | 1 | 7050-225 | MANIFOLD END CAP | 14 ga CRS |
| 4 | 1 | 7050-218 | MANIFOLD INLET CAP (.75") | 14 ga CRS |
| 5 | 1 | 29-090 | | |
| 6 | 2 | 7050-007 | BAFFLE-TIER 4 (6") | 20 ga #430 SS |
| 7 | 2 | 7050-005 | BAFFLE-TIER 2A (6") | 20 ga #430 SS |
| 8 | 2 | 7050-006 | BAFFLE-TIER 3 (6") | 20 ga #430 SS |
| 9 | 1 | 7050-001 | BAFFLE-TIER 1B (8") | 20 ga #430 SS |
| 10 | 2 | 7050-008 | BAFFLE-TIER 5 (6") | 20 ga #430 SS |
| 11 | 1 | 7050-002 | BAFFLE-TIER 1D (6") | 20 ga #430 SS |
| 12 | 1 | 7050-324 | PLATE-BURNER SIDE, RH | 16 ga SS |
| 13 | 2 | 7050-320 | AIR SCOOP, 6" NG BURNER | 18S/S |
| 14 | 1 | 44-036 | FLAME ROD RING | |
| 15 | 2 | 5350-168 | STIFFENER-OUTER SIDE PLATE | 18 ga S.S. |
| 16 | 2 | 5350-167 | STIFFENER-INNER SIDE PLATE | 18 ga S.S. |
| 17 | 1 | 7050-323 | PLATE-BURNER SIDE, LH | 16 ga SS |
| 18 | 1 | 47-030 | IGNITER TUBE | |
| 19 | 1 | IGSLV | IGNITER SLEVE | |
| 20 | 1 | 34-244 | WASHER-FLAT SPECIAL IGNITER TUBE | |
| 21 | 1 | 22-596 | JUNCTION BOX 3.75X1.5X1.5 | |
| 22 | 1 | 22-597 | JUNCTION BOX COVER 3.75X1.5X1.5 | |
| 23 | 2 | 7050-124 | BAFFLE-ABB 3 (6") | 20 ga GALV |
| 24 | 2 | 7050-122 | BAFFLE-ABB 2A (6") | 20 ga GALV |
| 25 | 2 | 7050-121 | BAFFLE-ABB 1 (6") | 20 ga GALV |
| 26 | 1 | 3Q7NIPP | NIPPLE, 3/4"-LENGTH PER UNIT | 3/4" DIA PIPE |

6" NATURAL GAS BURNER
BURNER-6 INCH

FIG. 14

| ITEM NO. | QTY. | PART NO. | DESCRIPTION | GUAGE |
|---|---|---|---|---|
| 1 | 1 | 7050-184 | REAR MANIFOLD (20") | 14 ga CRS |
| 2 | 1 | 7050-182 | FRONT MANIFOLD, NG (20") | 14 ga CRS |
| 3 | 1 | 7050-225 | MANIFOLD END CAP | 14 ga CRS |
| 4 | 1 | 7050-220 | MANIFOLD INLET CAP (1.25") | 14 ga CRS |
| 5 | 1 | 29-092 | | |
| 6 | 2 | 7050-325 | BRACKET-TIER SUPPORT | 16 ga SS |
| 7 | 4 | 7050-031 | BAFFLE-TIER 4 (10") | 20 ga #430 SS |
| 8 | 2 | 7050-028 | BAFFLE-TIER 2A (10") | 20 ga #430 SS |
| 9 | 4 | 7050-030 | BAFFLE-TIER 3 (10") | 20 ga #430 SS |
| 10 | 1 | 7050-023 | BAFFLE-TIER 1E (10") | 20 ga #430 SS |
| 11 | 4 | 7050-032 | BAFFLE-TIER 5 (10") | 20 ga #430 SS |
| 12 | 1 | 7050-022 | BAFFLE-TIER 1C (10") | 20 ga #430 SS |
| 13 | 2 | 7050-029 | BAFFLE-TIER 2B (10") | 20 ga #430 SS |
| 14 | 1 | 7050-020 | BAFFLE-TIER 1A (10") | 20 ga #430 SS |
| 15 | 1 | 7050-021 | BAFFLE-TIER 1B (10") | 20 ga #430 SS |
| 16 | 4 | 7050-132 | BAFFLE-ABB 3 (10") | 20 ga GALV |
| 17 | 4 | 7050-130 | BAFFLE-ABB 2A (10") | 20 ga GALV |
| 18 | 4 | 7050-129 | BAFFLE-ABB 1 (10") | 20 ga GALV |
| 19 | 1 | 7050-323 | PLATE-BURNER SIDE, LH | 16 ga SS |
| 20 | 2 | 7050-322 | AIRSCOOP, 6" NG BURNER | 18S/S |
| 21 | 1 | 47-030 | IGNITER TUBE | |
| 22 | 1 | IGSLV | IGNITER SLEEVE | |
| 23 | 1 | 24-244 | WASHER-FLAT SPECIAL IGNITER TUBE | |
| 24 | 2 | 5350-168 | STIFFENER-OUTER SIDE PLATE | 18 ga S.S. |
| 25 | 2 | 5350-167 | STIFFENER-INNER SIDE PLATE | 18 ga S.S. |
| 26 | 1 | 22-596 | JUNCTION BOX 3.75X1.5X1.5 | |
| 27 | 1 | 22-597 | JUNCTION BOX COVER 3.75X1.5X1.5 | |
| 28 | 1 | 7050-324 | PLATE-BURNER SIDE, RH | 16 ga SS |
| 29 | 1 | 44-036 | FLAME ROD RING | |
| 30 | 1 | 1&1QTNP | NIPPLE, 1 1/4"-LENGTH PER UNIT | 1 1/4" DIA PIPE |

20" NATURAL GAS
BURNER-20 INCH

FIG. 17

DIRECT GAS-FIRED BURNER ASSEMBLY

CROSS-REFERENCE TO RELATED APPLICATION

This application is a non-provisional patent application based upon a provisional patent application having Serial No. 60/135,142, filed on May 20, 1999, which is owned by the same inventors.

BACKGROUND OF THE INVENTION

The burner assembly of this invention is utilized in the capacity generally defined as a direct gas-fired industrial air heater or related type of make-up air heater. This type of heater is normally employed within an industrial or commercial complex which requires large volumes of tempered air to replace air that is being exhausted or to provide ventilation air to purge contaminants from the space. The invention herein is not a heat exchanger, since the combustion of the gas after its ignition takes place directly within the air stream being heated and not by any conduction thereof. It is the improvement of the invention that further adds to the efficiency of the combustion within an industrial heater of this design, so as to work most effectively and safely in producing the quantity of heated air that may be needed to warm the environs, and to effectively maintain a uniform and comfortable temperature within a predetermined volumetric space, as within a building, but at the same time, do it in such a manner that does not sacrifice safety in the heater design, during the performance of gaseous combustion in producing the source of heat. As a result, the heating equipment of this invention, in which the direct fired burner of this type is enclosed, contains no flue, and all of the by-products of combustion are released directly into the heated air stream, which is then directly discharged into the space being heated, and as a result it is desirable, and one of the primary further advantages of this current invention, to provide improved means for reducing the creation and release of deleterious exhaust of other gases, either in the form of carbon monoxide, or nitrogen dioxide, that is discharged during the gas combustion. The improved heater of this design substantially reduces to a minimum the generation of the deleterious types of combustion by-products that may be directed into the space being heated, and certainly functions to alleviate the likelihood that any persons therein may be harmed through the breathing of such noxious gases over a sustained period of time.

Direct gas-fired heaters typically are constructed to a variety of configurations. In the majority of such heaters, as manufactured, the burner is arranged upstream of the fan inlet, and which functions in the manner of the draw-through type of arrangement. A lesser number of other manufacturers position their burner downstream of the fan or blower discharge, in what is defined as a blow-through configuration. An example of the latter can best be seen in the U.S. Pat. No. 3,630,499, which is owned by a common assignee of the improved burner of the current design.

Other types of burner arrangements that exists in the prior art can be readily seen in the Ehrich U.S. Pat. No. 3,485,043; Coppin et al U.S. Pat. No. 4,573,907; in the Childs U.S. Pat. No. 3,993,449; in addition to the Pillard U.S. Pat. No. 3,885,919. Also Canadian Pat. No. 560,916 to Kind shows a form of gas burner contained within a heating arrangement which incorporates a flame zone of a combustion chamber.

In addition, other burner assemblies are shown in the prior U.S. Patent to Lewis, U.S. Pat. No. 4,523,905; the patent to Coppin, U.S. Pat. No. 4,869,665; and Kikutani, et al U.S. Pat. No. 4,610,626.

As is well known in this art, the performance characteristics of the burner necessarily determines the operational range of the heating equipment, when tested to guage whether it is in compliance with various requirements of the American National Standards Institute (ANSI), governing the functioning of the direct gas-fired industrial air heater, of the type described in accordance with this invention. The burner design for which this patent protection is sought herein utilized in the industrial heating appliance, such as the identified direct gas-fired make-up air heaters and direct gas-fired industrial air heaters. This design may also be utilized in industrial process equipment, such as ovens or dryers. These appliance standards that exist for this type of equipment, when it is utilized for providing tempered replacement air as in a make-up air application or for providing space heating to overcome the heat loss in industrial buildings, are regulated by standards, and two such standards which are generally reference by building code authorities are the ANSI standard Z83.4 for the direct gas-fired make-up air heaters, and the ANSI standard Z83.18, for direct gas-fired industrial air heaters. These standards establish the criterian for the maximum increase allowed through the heater for the by-products of combustion, such as the carbon monoxide, nitrogen dioxide, carbon dioxide, and aldehydes. Obviously, such limits are imposed for the purpose of regulating the air supply of the facility where the equipment is to be installed, for the safety of the workers, and others, subject to such type of heating conditions. Generally the air flow through a heater of this type design, and the temperature rise that occurs for the air that is being heated, determines the heating capacity of the subject unit. The airflow is directly related to the fan as selected, the motor horsepower of the unit driving the fan, and the static pressure on the system during its functioning. The temperature rise is controlled by the gas flow delivered to the burner, at the given air flow rate for the capacity of the air that has been drawn through the unit, as induced by the blower.

As previously explained, the ANSI standards generally provide an industrial self regulation of the minimum requirements that must be met by units of this design. These standards generally allow for specific maximum additive levels of four particular by-products of combustion, as previously identified, that may be released from the heating unit of this type during its functioning. These products of combustion as previously explained, and their respective allowable levels are as follows:

Carbon dioxide, 4,000 parts per million (ppm);

Carbon monoxide, 5 parts per million (ppm);

Nitrogen dioxide, 0.50 parts per million (ppm); and

Aliphatic aldehydes, 1.0 parts per million (ppm).

The allowable rise concentration through the heater for carbon monoxide is this 5 ppm, and for nitrogen dioxide is 0.5 ppm. As can be understood, these are extremely small levels of elevation, and therefore, it is very important that a burner of this design be very efficiently and effectively designed, for the purpose of minimizing the derivation of these combustion by-products. These particular derived deleterious chemical compounds, which are generally recognized in the trade as undesirable by-products from the functioning of heating units of this type, and their gases of combustion, are basically recognized as unwanted derivatives, which, if they can be reduced to an absolute minimum, not only adds to the safety of all people within the heated space, but enhances the quality operations of the heating unit, as designed. The unit of this particular invention has been designed to provide for a minimization of the output of these undesirable compounds, through the unique enhanced design of particular characteristics and features constructed into the improved heater of this invention, to attain such desirable results.

In recent years, changes to the ANSI standards have been adopted as part of the standards harmonization effort between the U.S. and Canada associated with the North American Free Trade Agreement (NAFTA). The results of these changes have tended to make the requirements of the standard more stringent. The combustion levels have remained the same for the U.S. as before, however, the Canadian levels for combustion by-products for CO and $NO_2$ are half of the previously allowed levels. More significantly for the U.S. manufacturer's is the operating points at which combustion testing has been conducted has shifted from the ideal operating point as defined by the manufacturer to the extreme end of the possible operating range of the heater as defined by the controls provided by the manufacturers. The low air velocity across the burner remains an existing construction requirement, but as part of the harmonization process, a high velocity switch has now been added to shut off the burner if the air velocity across the burner exceeds that specified by the manufacturer. These high and low air velocity controls therefore define the operating range of the heaters as it relates to the pressure drop across the burner. The standard utilizes the set point of the high and low air velocity switches and adds or subtracts the worse case tolerance of the switch to determine the test point for making combustion by-product measurements.

The impact of this new evaluation procedure is that previously certified draw through type heaters will require downward adjustments to the maximum temperature rise and burner capacity ratings in order to demonstrate compliance with the additive combustion by-products criterian of the standard. To expand upon this thought, one needs to examine the rating data of a typical heater which may have previously met the combustion by-products levels with a temperature rise of 120° F. and a burner capacity rating of 550,000 Btu/hr/ft when the tests were conducted at a velocity across the burner of 2850 feet per minute which nearly approximates 0.75 inches W.C. pressure drop. When tested to the new criterian, the achievable temperature rise where compliance to the standard is achieved may fall to 95° F. and the capacity rating of the burner may be found to be only 450,000 Btu/hr/ft when evaluated at 0.35"W.C., the low pressure drop setting including worse case tolerance of 0.05"W.C. for a switch setting of 0.40"W.C., and at 0.90"W.C., the high pressure drop setting including worse case tolerance of 0.07"W.C. for a switch setting of 0.83"W.C. The velocity across the burner will approximate 2250 feet per minute at the low airflow switch setting and 3400 feet per minute at the high airflow switch setting which thus defines the allowable range of operation of the heater within the guidelines of its certification.

It has previously been determined through testing that there are a number of major factors that effect the production of carbon monoxide within the gas combustion production process. Ideally, the gas and combustion air needs to be mixed as completely and thoroughly as possible as soon after the gas is introduced into the burner assembly. On the other hand, the quantity of air delivered must be at the level which induces effective controlled combustion, to provide maximum heat, without generating hot spots within the burner assembly, and more specifically its combustion chamber. If too little air is entered into the combustion chamber of the burner, then incomplete combustion occurs, and noxious gases can escape into the heated environment. This raises the level of carbon monoxide output, which could easily be measured in the discharge air stream. On the other hand, if too much combustion air introduced at the low and medium fire combustion zone, quenching of the flame can occur, and this abrupt cooling also causes incomplete combustion. All this can produce the undesirable type of deleterious by-products, as previously explained. Thus, an equilibrium point desirably must be attained and maintained with respect to how much air is introduced into the burner, in combination with the amount of gas discharged from the manifold, and the location in emplacement of the air intake into the combustion zone.

For a blow through type heater, an additional factor which effects the development of carbon monoxide in the burner process was found related to this quenching feature of the flame, with respect to the abrupt cooling of the flame after it exits from the burner. In units of this type, the discharge air leaving the fan or blower results in a greater volume of air being forced around the burner compared to that entering the combustion zone. With the burner downstream of the blower, the burner acts as a restriction to the flow of air, thereby compressing the air, causing the velocity to increase as it passes the burner. Once the restriction is passed, the large volume of air from the upper and lower portions of the duct expands rapidly to equalize pressure within the duct causing the cool air to impinge the flame tips that are extending beyond the end of the burner with significantly increased CO output. On the other hand draw through type heaters escape this phenomena as a result of near laminar flow which is a function of being on the suction side of the fan and located in a lower air velocity zone by the very nature of the draw through design.

Unlike the findings in a blow through type heater where the output level of carbon monoxide was reduced by limiting the amount of combustion air early in the burner, near the gas ports, the draw through heater was found to require a more substantial effort to inject combustion air into the combustion chamber just proximate its manifold. It was determined that without sufficient disruption of the gas early in the combustion process, that at higher capacity levels, unburned raw gas would migrate along the length of the manifold as if it were being induced by some uneven external velocity or air pattern and be depicted by significantly longer flame tips being experienced on the end of the burner or at other points along its length. By aggressively creating a disruptive or turbulent area near the manifold with the mixing of combustion air and gas, this phenomena was eliminated. It was further determined that LP gas required larger volumes of combustion air be supplied early in the combustion process and modifications to the burner design associated with increasing the combustion air openings just proximate to the manifold and substantially increasing the velocity across the burner thereby forcing more combustion air into the burner were necessary to mix thoroughly and prohibit the formation of carbon molecules within the burner in the form of soot. The air velocity across the burner had to be increased in the neighborhood of 20 percent to accomplish the required results for the LP gas application. The airflow switch control settings therefore had to be increased from 0.40"W.C. to 0.60"W.C. and from 0.83"W.C. to 1.12"W.C. and the associated combustion performance testing was conducted at 0.55"W.C. and 1.20"W.C. as part of the product certification.

It was also found that, if the combustion air mixing was too aggressive, hot spots were created which would increase the production of nitrogen dioxide and substantially raise the acoustical noise level of the combustion process. This balance between too little and too much combustion air early in the combustion chamber is obviously critical and controlled by a combination of size and shape of the combustion air opening and the velocity maintained across the burner as it is envisioned in this invention.

Equally significant to the above findings was that the area of the combustion chamber immediately downstream of the initial combustion air injection area was extremely sensitive to both the volume and the velocity of the combustion air entering the combustion chamber. Only a limited amount of combustion air could be injected into middlemost region of the combustion chamber without affecting the creation of the unwanted combustion by-products.

For the draw through type heaters, burners are furnished in lengths to accommodate the gas capacity necessary to provide the temperature rise as it relates to the airflow which being furnished. The gas capacity per unit length is established from the results of the certification testing. The certifying agency examines several heater models when a full line of product is being prepared for the marketplace and select at a minimum test models which utilize the smallest and the largest burner size. The burner of this particular invention was evaluated over a length from 6 inches to 72 inches and the capacity rating which was derived from the certification testing yielded varied from 940,000 Btu/hr per foot of burner for the smallest to 1,050,000 Btu/hr per foot of burner for the largest. This is more than twice the Btu/hr rating per foot that was available from other draw through burner manufacturer's which supply this industry when evaluated to the new harmonized standard. As a result of this increased burner intensity, the end plate of the burner was subjected to overheating during the burner development and additional steps were taken to cool the end plates by providing air gaps and secondary slots to act as an air curtain to push the flame away from the end plates and thereby lower the nitrogen dioxide levels generated. It was determined that the smallest burner (6 inches long) required special treatment related to the size of the air gap and the standard gap was decreased for the natural gas burner because the air curtain actually increased the carbon monoxide generated at an intermediate firing rate. For the six inch LP burner, the end plate gap had to be increased slightly from the standard size to reinforce the air curtain effect and as a method of adding more combustion air to the combustion chamber.

As a result of the longer burner lengths associated with the draw through heater, construction techniques were developed which would secure multiple sections of burner baffles and air balancing baffles to a common manifold. Previous methods of assembling burner sections included bolting sections of manifold together.

The current invention has been designed to take into consideration these various features, and to not only regulate the amount, capacity, and particularly location of the quantity of gas being ejected from the manifold into the chamber of combustion, but likewise, to provide for the adequate regulation in the delivery of air into the combustion chamber, the proper placement of its positioning, all within the area of combustion, and to inject the adequate amount of air to augment combustion, at particular locations, and to specific amounts, in order to enhance the efficiency of combustion, and thereby reduce the development of noxious gases released as exhaust from the heater assembly.

In addition to the foregoing, the subject matter of this invention further contemplates modifications to the structure of the burner embodiment and more specifically its various formed chambers in order to minimize the amount of heat exposure of the various walls and chambers, in addition to adding modifications, in the form of air balancing baffles, to select baffled tiers to better isolated areas of desired maximum combustion, to reduce the development of hot spots upon the various structured walls, and thereby, and which has been found through experimentation and research, to favorably reduce the development of nitrogen dioxide, and its emissions, from the burner of this invention during its functioning.

SUMMARY OF THE INVENTION

The subject matter of this invention contemplates modifications to the structure of pre-existing burner designs of this type, which is previously explained, one of which is generally shown in the U.S. Pat. No. 3,630,499, as owned by a common assignee to this invention, in addition to the structure of the burner assembly disclosed in the parent patents, now U.S. Pat. Nos. 4,929,541, 4,993,944, 5,083, 918, and 5,399,086. As can be readily seen in these earlier devices, that burners of this type are generally fabricated of a pair of walls, upper and lower tiers of air admitting surfaces, in order to form a combustion chamber, and which arranges a manifold at its intake end, in order to inject adequate supplies of gas into the combustion chamber, which in combination with the entering air, forms the source of combustion for heating of the supply of air forced through the burner assembly, and the duct or housing in which the burner, and its blower, locates. The main components of the burner of this current design, as improved, include its baffles, which have been arranged and reconstructed, particularly where located in proximity with the gas manifold, in order to provide for a more controlled delivery of air entering into the area of combustion, within the combustion chamber. The addition of air balancing baffles for the major portion of the burner which are connected in conjunction with the upper and lower tiered baffles of the combustion chamber, as formed, further add to the convenient regulation in the delivery and flow of air into the combustion chamber, during its functioning, not only for the purpose of reducing inefficient burner, and thereby reducing its output of deleterious gases of exhaust, but likewise, to reduce the formation of hot spots, which can generate some of the types of noxious gases, as previously identified.

With the location of this particular burner in a near laminar airflow pattern as explained earlier, it has been found desirable to increase the slot openings to permit sufficient quantities of air into the combustion chamber proximate its manifold, and in addition, to significantly restrict the slot openings such that lesser quantities of air immediately downstream therefrom. This is somewhat contrary to previously related patents because it was necessary to effect a higher degree of mixing of combustion air with the raw gas almost immediately in the combustion zone to obtain an even distribution of flame across the full length of the burner and avoid quenching of flame and reduce the generation of hot spots, as previously explained, and the undesirable development of carbon monoxide, and the like downstream. Without this forced mixing early in the combustion chamber, longer burners could experience the migration of unburned raw gas to the end of the burner as exhibited by significantly longer flame tips than present along the rest of the burner.

Furthermore, in addition to utilizing air balancing baffles to regulate the entrance of air into the vicinity of the combustion chamber, along its arranged length, further improvements were found to be helpful which were associated with providing means for adding controlled volumes in the form of an air curtain in and near each of the end plates of the burner. The relative size of air curtain was found to be more sensitive in the shortest burners than it did in burners with slightly longer lengths. As the length of the burner increased, the impact of how much the end plates adds to the creation of deleterious gases becomes less significant to the total. The primary purpose of the air curtains was to reduce hot spots on the end plates of the burner but it included a secondary purpose of adding more combustion air in a localized vicinity of the end plates. For the six inch natural gas burners, too much air quenched the flame and the size of the gap between the end plate and the flare side baffle had to be reduced, while on six inch LP burners more combustion air was found to be beneficial so the slot size was increase over that of longer burners.

The manifold, which introduces the supply of gas into the burner, has had its output ports or gas orifices uniquely designed, as explained in this and the parent application, generally through empirical testing, to determine the exact amount and desired quantities of gas to be strategically injected into the area of combustion, in order to attain efficient combustion, and to reduce the development of carbon monoxide, for the reasons as previously explained. In addition, the sidewalls of the burner assembly have been redesigned, in the manner as previously explained, and formed principally in an arrangement that achieves a specified air gap prior to their flaring, so as to minimize and reduce their direct exposure or proximity location to the origin or center of the area of gaseous combustion, and therefore, reduce, if not significantly eliminate, the generation of hot spots, as the vicinity of these sidewalls, which normally induce the creation of nitrogen dioxide, which is another of the undesirable exhaust by-product, in older burner designs, that must be avoided, in order to provide more efficient delivery of cleaner heat to the building being warmed.

The inclusion of the air balancing baffles that connect to a portion of the tiered upper and lower baffles that normally form the combustion chamber, of the type as previously explained in the identified earlier parent applications. The addition of these air balancing baffles, in combination with the upper and lower tiered baffles, form multiple cavity arrangements that have been found to substantially reduce any warpage that may occur proximate the gas manifold, during sustained heater operations. The slot design for each air balancing baffle was limited to half slots (only 1 inch long) compared to previous patent submissions. In addition, the use of air balancing baffles has been found to be unnecessary for adequate penetration of the combustion air into the vicinity of the flame during high firing rates. Furthermore, the usage of air balancing baffles, incorporating predesigned slots, that regulate and control the amount of air passing into the combustion chamber, has been found to significantly reduce warpage of those burner baffles normally arranged in the lower tiers and in more proximity to the gas manifold, during heater functioning. Additionally, further problems resolved through the usage of the predesigned baffling arrangement, and air balancing baffles, of this invention, is to reduce the quenching of the flame tips that burn beyond the end of the burner, by means of controlling and regulating the quantities of air being delivered into the combustion chamber, along the length of the tiered baffles, so as to regulate the volume of air that enters therein, from both the top and bottom segments of the burner, for the purpose of affording more efficient burner, better regulation of heat, reduction in the generation of hot spots, particularly during prolonged operations of the burner of this improved design. Furthermore, slots have been added to the downstream burner baffles where they meet the sidewalls or end plates of the burner to act as air curtains and add a cooling effect to the end plates.

Burner tier supports were designed to secure multiple burner baffles together over the length of the burner and slots were added in the end of the burner baffle to continue the spacing of the slot center distance that was set up for the particular burner tier.

The jointing of the burner manifold, the burner baffle(s) and the air balancing baffle(s) was found to be very critical with respect to any air leakage at that joint impacting the combustion process or causing premature ignition of the gas which might result in the warpage of the manifold and associated components. The application of a high temperature caulking material over the joint eliminated any such leakage and thereby provided a more consistent burner performance than would otherwise be possible with so many different parts being brought together.

As previously explained, better control of the flame of combustion reduces the generation of undesirable combustion by-products. In order to achieve this increase in output rate, the improvements of the type as summarized herein, and as to be subsequently described, were required to be modified into the burner design in addition to other improvements as will be reviewed.

The improvements made in this current invention are designed to add further enhancements to the subject matter of the burner as shown in our prior applications. For example, during operations of burner assemblies, under prolonged conditions, it becomes apparent that various improvements can be made in order to make it more effective an operation. In this particular instance, it has been found that various hot spots develop along various structural aspects of this invention, and therefore, the location of various slots, for passage of air, at specific locations, are designed to add air at select points in order to reduce the incidence of elevated heat, and to maintain uniformity of temperature, throughout all segments of the burner during its sustained operation.

A synopsis of the design, provisions derived, and the various design aspects of the heat assembly, can be seen and analyzed from the following review.

BURNER—DRAW THRU HEATER DESIGN

I. Heater Design

A. Burner in airstream ahead of blower

Pressure drop across burner is critical and is maintained within certain specifications. (Data specific to Cambridge).
1. For natural gas applications, pressure drop maintained between 0.40 and 0.83"WC Setpoint=0.68"WC
2. For LP applications, pressure drop maintained between 0.60 and 1.12"WC. Setpoint=0.90"WC.

B. Profile plate supplied to maintain the pressure drop across burner.

C. Pressure drop across burner is reduced automatically as temperature rise increases as a function of expanded air handled by the fan. (Density changes and air volume though fan remains essentially constant).

D. Combustion chamber is under a negative pressure relative to it surroundings due to its location being downstream of the profile plate.

E. Air velocity across burner is maintained between setpoints of high and low air velocity switch settings.

F. Flame rod located at furthermost point from ignition source.

II. Standard Provisions
  A. Max. Rise: CO=5 ppm; $NO_2$=0.5 ppm; $CO_2$=4000 ppm.
  B. Combustion tests performed at Air flow switch trip point including worst case tolerance.
    1. For natural gas applications, actual testing conducted at 0.35"WC and 0.90"WC. (Used to be only at the nominal setpoint.)
    2. For LP gas applications actual testing conducted at ).55"WC and 1.20"WC. (Used to be only at nominal setpoint.)
III. Aspects of Burner Design That are Unique
  A. Gap between burner side plate and flange on burner flare. (This provides an air curtain that pushes flame away from side which keeps it from overheating the side plate and keep $NO_2$ in check.
    1. For burners longer than 6 inches, the optimum gap found to be 0.062 inches.
    2. For natural gas burners at 6 inches, the optimum gap found to be 0.031 inches.
    3. For LP gas burners at 6 inches, the optimum gap found to be 0.093 inches.
  B. Burner Baffle slot detail involved a stepped slot for natural gas burners. Top part of slot has width of 0.125 inches and is 0.875 inches long while the bottom portion of slot is only 0.093 inches wide and is 1.312 inches long. LP burners utilize full 0.125 inches slot width.
  C. No shroud or diverter are provided.
  D. Air balancing baffles are required only on first three burner baffles.
    1. Air balancing baffle #1 has 0.125 inch wide slots which are 1.00 inch long on 2 inch centers.
    2. Air balancing baffle #2 has 0.062 inch wide slots that are 1.00 inch long on 2 inch centers for natural gas applications and 1 inch centers for LP applications.
    3. Air balancing baffle #3 has 0.062 inch wide slots that are 1.00 inch long on 1 inch centers.
  E. Burner baffle #4 has 0.062 wide slots by 1.125 inches long at the end of each burner baffle.
  F. Burner Baffle #2 has a 0.062 wide slot by 1.125 inches long at one end of the baffle when it interfaces with a burner tier support. (This ensures an air opening does not exceed 2 inches).
  G. Burner tier supports are provided to accommodate longer burners. (Greater than 16 inches).
  H. High temperature caulking is utilized to seal the burner baffle and air balancing baffle at manifold. This eliminates the possibility of an unwanted air gap from causing a disruption of combustion process desired.
  I. Burner length is much longer than blow thru design. (Six feet versus 20 inches).
  J. Burner manifold length is fixed at the time the burner is manufactured as opposed to sections being bolted together to obtain the length required for the specific gas capacity.
  K. Burner orifice size if 0.125 inch diameter for natural gas burners with the 0.093 inch orifices at each end of the manifold for ignition and flame detection purposes.
  L. Burner orifice size is 0.109 inch diameter for LP gas burners with the 0.093 inch orifices at each end of the manifold for ignition and flame detection purposes.

The various objects and advantages of the present invention will become more apparent to those skilled in the art upon reviewing the foregoing summary, and upon undertaking a study of the description of its preferred embodiment, in view of the drawings.

BRIEF DESCRIPTION OF THE DRAWINGS

In referring to the drawings.

FIG. 14 is an isometric view of the twenty inch gas burner assembly of this invention;

FIG. 17 is a parts list and specification sheet for the burner assembly shown in FIGS. 15 and 16.

DESCRIPTION OF THE PREFERRED EMBODIMENT

Figure 1:
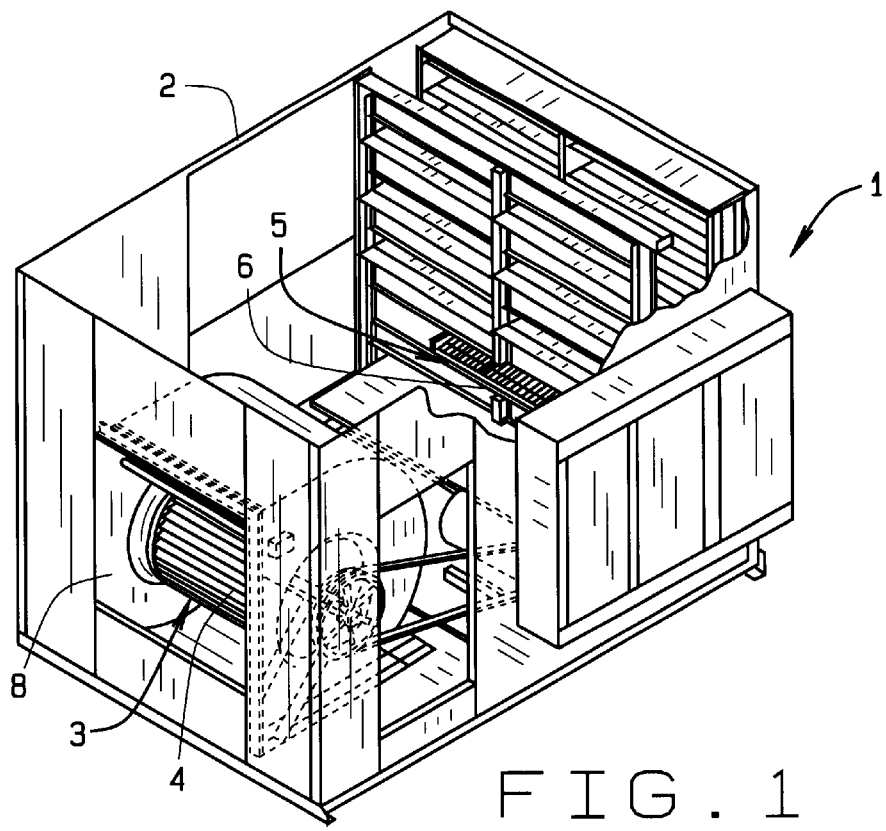
FIG. 1 is an isometric view of the housing and ductwork encasing the burner and blower assembly of this improved invention.

In referring to the drawings, and in particular FIG. 1, therein is shown the heater 1 of this invention, which is disclosed including a housing 2, that is generally formed in conjunction with the adjacent sides simulating ductwork used for conveyance of air to and from the heater of this invention. A blower 3 may be operated through the usual motor (not shown), which causes the blower rotation and through the movement of its vanes, as at 4, includes a volumetric flow of air through the housing, and the burner or air heater of this invention. This type of heater usually may be mounted upon the roof of a building, or perhaps just interiorly thereof, or just inside of an outside wall, to induce the intake of outside air, heated, and then discharge it into a specified space, generally within an industrial or other commercial building, to attain a warming or make-up of internal air thereof for the comfort of its occupants. The burner assembly, as at 5, is arranged just forwardly of the inlet 6 of the profile plate, in a manner that is well known in the art, and functions to provide for combustion of gas to furnish direct heating of the flowing air, which for this type is of the draw through air form of system, for purposes as previously described. Provided forwardly of the blower assembly is the outlet 8, which may connect with the ductwork, or simply supply the heated air directly into the building, provided at the front of the housing 1 of the entire assembly.

Figure 2:
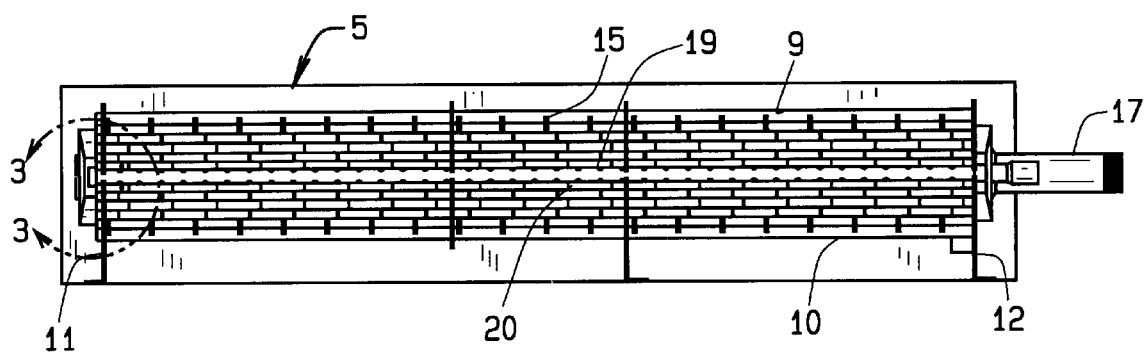
FIG. 2 is a front view of the tiered baffles and burner assembly of this invention.
Figure 4:
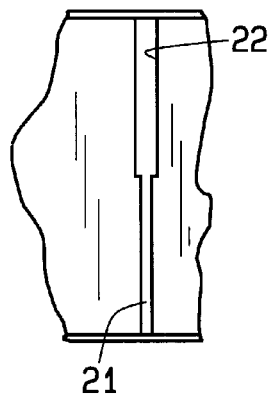
FIG. 4 is a sectional view of once of the compound air slots generally located along the first baffle tier, at the manifold, for natural gas burners designs.

The burner assembly 5, as can be seen in FIG. 2, includes a series of tiered baffle segments of the upper and lower burner assembly, as at 9 and 10, respectively, and which incorporates side walls, as at 11 and 12. A burner manifold 13 is provided rearwardly and centrally of the burner assembly, and a gas intake pipe 14, is provided laterally thereof. The series of tiered baffle segments of the burner assembly allow for the passing of air therethrough, through the variety of apertures, one as shown in FIG. 4, which function as air intake ports for movement of air through the tiered baffles, and to the burner assembly, to provide for very precise and controlled combustion of the ignited gases eminating from the manifold, during its functioning. See also FIG. 11.

Figure 3:
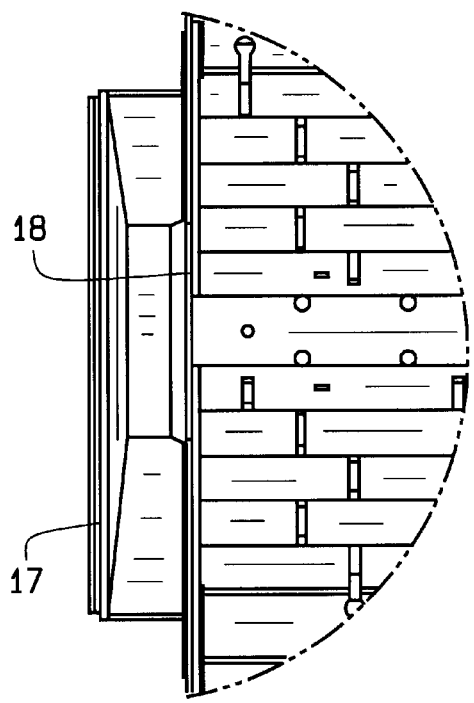
FIG. 3 is a sectional view of the side of the tiered burner and its side formed pockets as shown at B in FIG. 2.

As can be seen in FIG. 3, in an order to reduce hot spots, or locations where excessive nitrogen dioxide may be generated, and along the vicinity of the side pockets 17, for the burner assembly, there are provided air slots or gaps, one as shown at 18, which allows for passage of a segment of the drawn through air to pass therethrough, enter into the side pocket 17, to provide for a cooling effect at that location, and liken to an air curtain which acts to prohibit direct flame contact with the side pocket, and to provide for proper control of the combustion gases, and the generated flame, during functioning of the burner assembly.

In addition, as can be seen in FIG. 4, the first baffled tiers 19 and 20, adjacent, just forwardly, of the manifold 13, includes a compound slot, having a thinner air gap or slot 21 just adjacent the manifold, and slightly outwardly therefrom, and communicating therewith, is a broader gap or air slot 22, that provides for the very controlled entrance of air drawn through the burner assembly, to achieve the purposes as previously summarized, and as explained herein.

Figure 11:
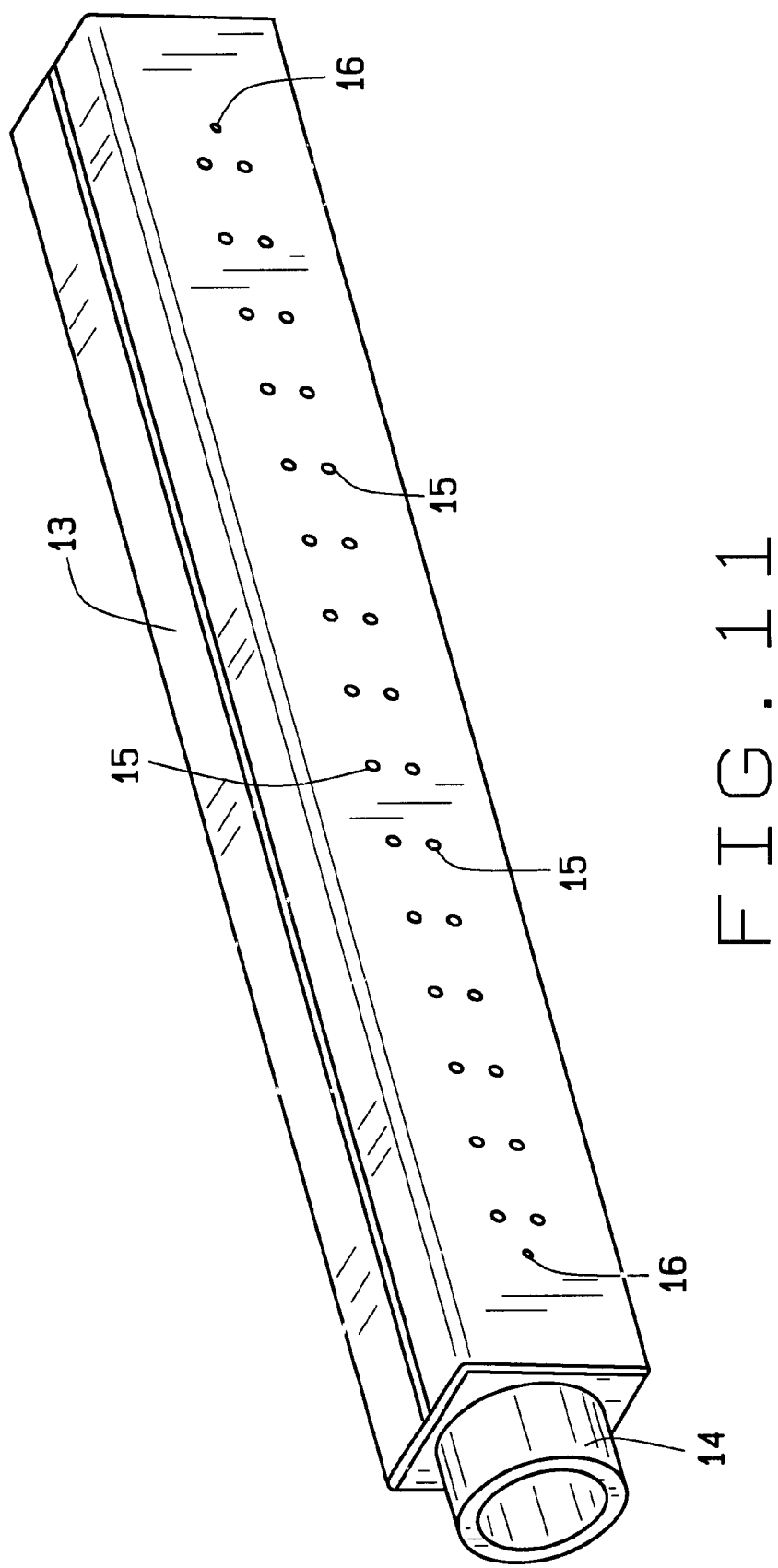
FIG. 11 is an isometric view of the burner manifold of this invention.

The particular manifold, that emits gas into the burner assembly, can be noted at 13 within FIG. 11. It includes a gas pipe, as previously explained at 14, arranged to one side, and includes a series of gas passing apertures 15, generally arranged on dual levels, as can be noted, and which have been provided and arranged in order to regulate the flow of gas into the combustion chamber, to precisely control the generated flame therein, for reasons as previously reviewed. In addition, there may be lateral apertures 16 perhaps smaller in diameter than those of the apertures 15, in order to furnish a precisely controlled amount of gas into these lateral regions of the manifold, during functioning of the burner assembly.

Figure 5:
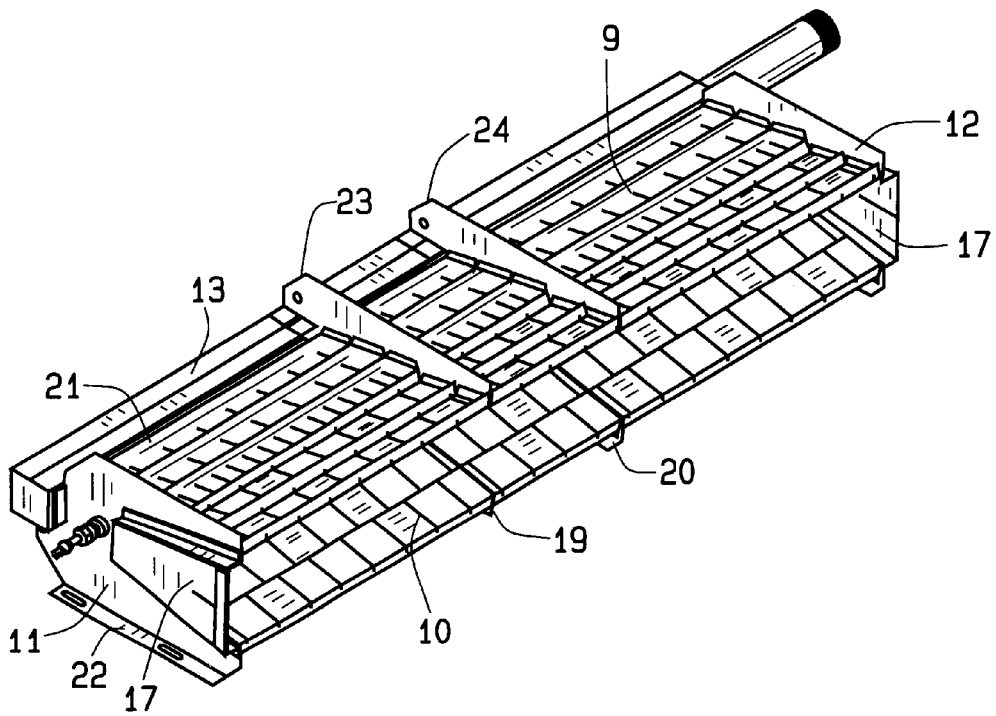
FIG. 5 is an isometric view of the multi-length tiered burner and baffle of this invention.

FIG. 5 shows the burner assembly of this invention as previously explained with respect to the assembly described in FIG. 2. In this particular instance, it can be seen that the gas manifold 13 has a series of braces 23 and 24 welded to the manifold, for both the upper and lower baffles. The lower braces can be seen at 23a and 24a. These braces extend forwardly, and have secured thereto the tiered baffles 9 and 10 as previously explained. In addition, where the back ends of the baffles, both upper and lower, are arranged in proximity with the manifold, as for example, at the upper baffle, at 21, a sealing may be applied thereto, such as a heat resistant caulk, in order to seal off the entrance of any air therethrough, and for reasons as previously explained. The side walls 11 and 12 have their side pockets 17 applied thereto, structurally, and for functioning for the purposes as previously explained. The bottom of the side walls 11 and 12 include an out turned flange 22, on each side, to allow for their bulking or otherwise fastening to the bottom of the housing 1, as previously reviewed. FIG. 5 also shows the air balancing baffles for the first, second and third burner tiers which consists of half slots.

Figure 6:
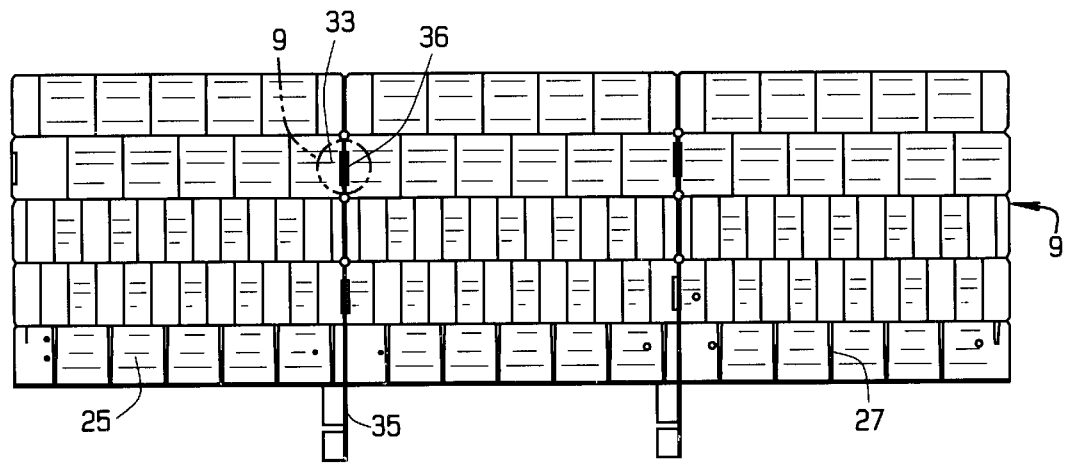
FIG. 6 is a plan view of the interior of the top baffle assembly.
Figure 7:
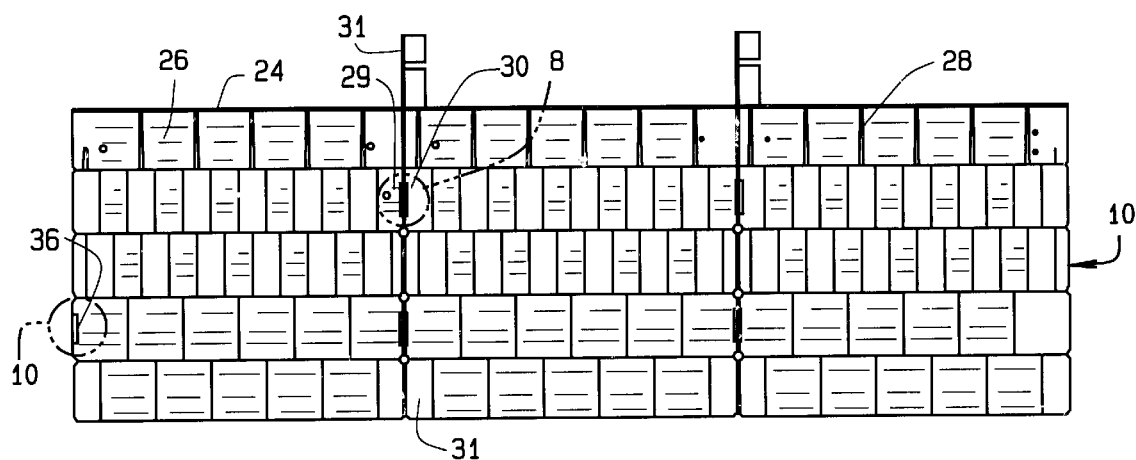
FIG. 7 is a plan view of the interior of the bottom baffle assembly.

FIGS. 6 and 7 disclose planned views of the internal surfaces of the tiered baffles, both for the top baffle 9, and the bottom baffle 10. Their inner or back edges 23 and 24, and which are adjacent to the gas manifold, form the initial tiers 25 and 26. It is within these tiers that the compound slots, as can be seen in 27 and 28, and as previously explained with respect to the FIG. 4 embodiment, provide for a very precisely controlled delivery of air directly adjacent the manifold, as it discharges its air and gas into the combustion chamber, for ignition. In addition, these compound slots, as at 21 and 22, provide a regulated supply of air, drawn through the heater, in the laminar air flow fashion, as previously reviewed, to furnish a very regulated initial burn of the combustion gases, discharged into the chamber.

Figure 8:
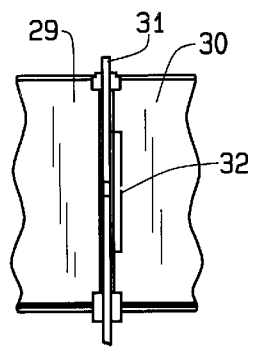
FIG. 8 is a view of the located slot at a juncture between baffle sections to allow air to pass therethrough and into the influence of the burner assembly, generally as taken at A in FIG. 7.
Figure 9:
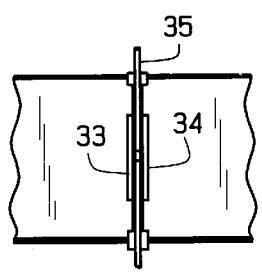
FIG. 9 is a sectional view of the air slots formed in the fourth tier of the top baffle taken along the line C of FIG. 6.
Figure 10:
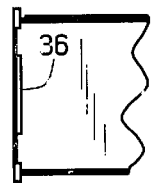
FIG. 10 is a sectional view of the air slot provided at the end of a tiered baffle to allow air to pass therethrough and into the influence of the burner assembly, as shown at B in FIG. 7.

In addition, FIG. 7 and FIG. 8 show how two adjacent sections, of the tiered baffles, as at 29 and 30, and where they are joined together by the means of brackets 31, are provided with an air gap or slot 32 to allow for entrance of air therethrough, and to prevent the creation of a hot spot, or even in the alternative, a lack of combustion thereat, in the event that such an air slot 32 was not provided. FIG. 9 shows the arrangement of a pair of slots, as at 33 and 34, in the fourth tier of the top baffle and duplicated in the bottom baffle assembly, to allow for entrance of air to either side of the bracket 35, as noted. See FIG. 6. This is also to provide for precisely controlled delivery of air into the combustion chamber, to achieve the degree of control for the combusting gases within the heating chamber of this burner assembly. FIG. 10 discloses a side slot, as at 36, along the side edge of the composite bottom tiered baffle, within its tier 4, as can be noted. See also FIG. 7.

Figure 12:
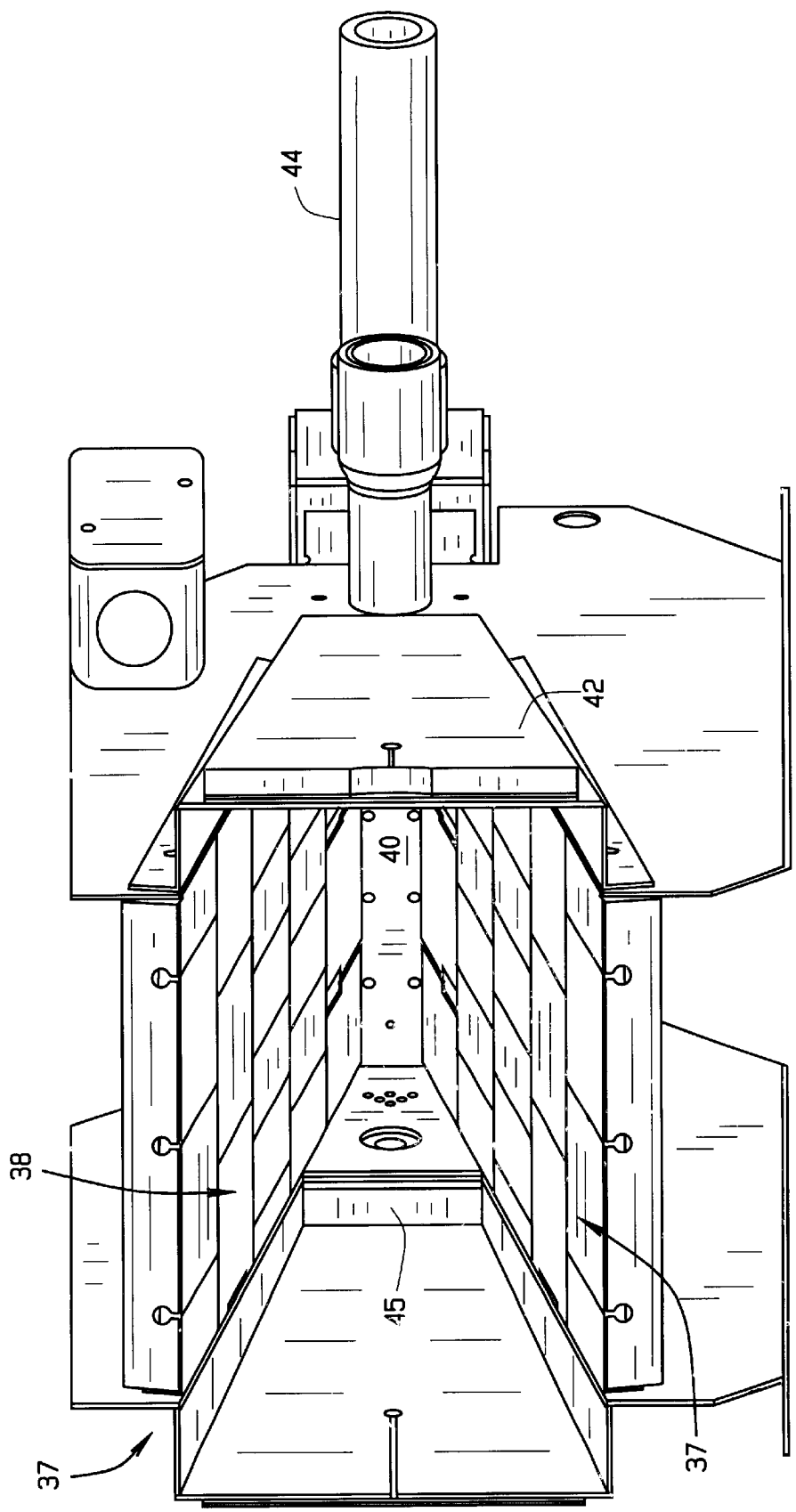
FIG. 12 is an isometric view of the six inch gas burner and tiered baffle arrangement of this invention.
Figure 13:
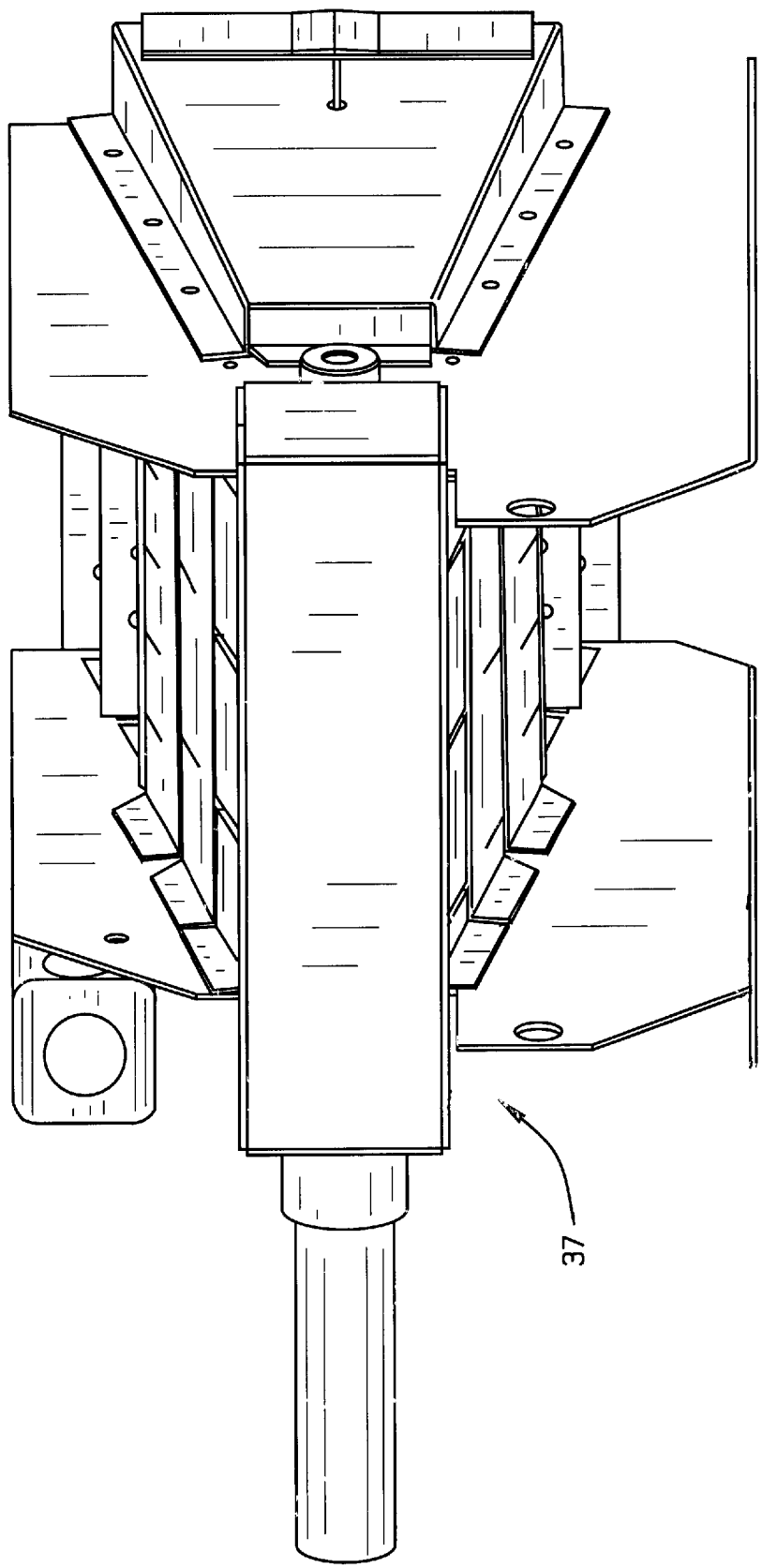
FIG. 13 is an isometric view of the back of the six inch gas burner assembly, as shown in FIG. 12.

FIG. 12 discloses the smallest or six inch gas burner assembly 37 for this invention. It includes the upper tiered baffles 38, the lower tiered baffles 39, embracing the upper and lower edges of the gas manifold 40, as noted. In addition, the side chambers 41 and 42 can be seen, and the back edge of the side chambers include the slots 43, for the purposes as previously described with respect to the FIG. 3 embodiment. Gas is delivered to the manifold 40 by means of the gas line 44. FIG. 13 provides a rear view of the smaller gas burner assembly as described with respect to FIG. 12. FIG. 14 provides a specification sheet describing various components of the burner assembly as shown and described in FIGS. 12 and 13.

Figure 15:
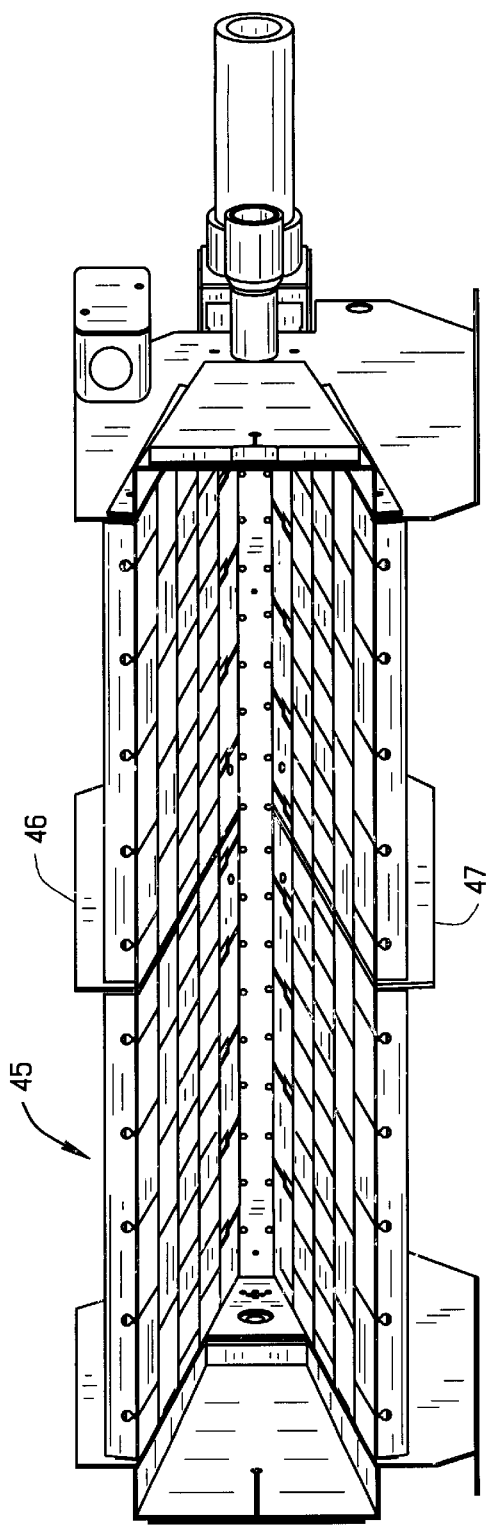
FIG. 15 is a rear isometric view of the burner assembly of FIG. 14.
Figure 16:
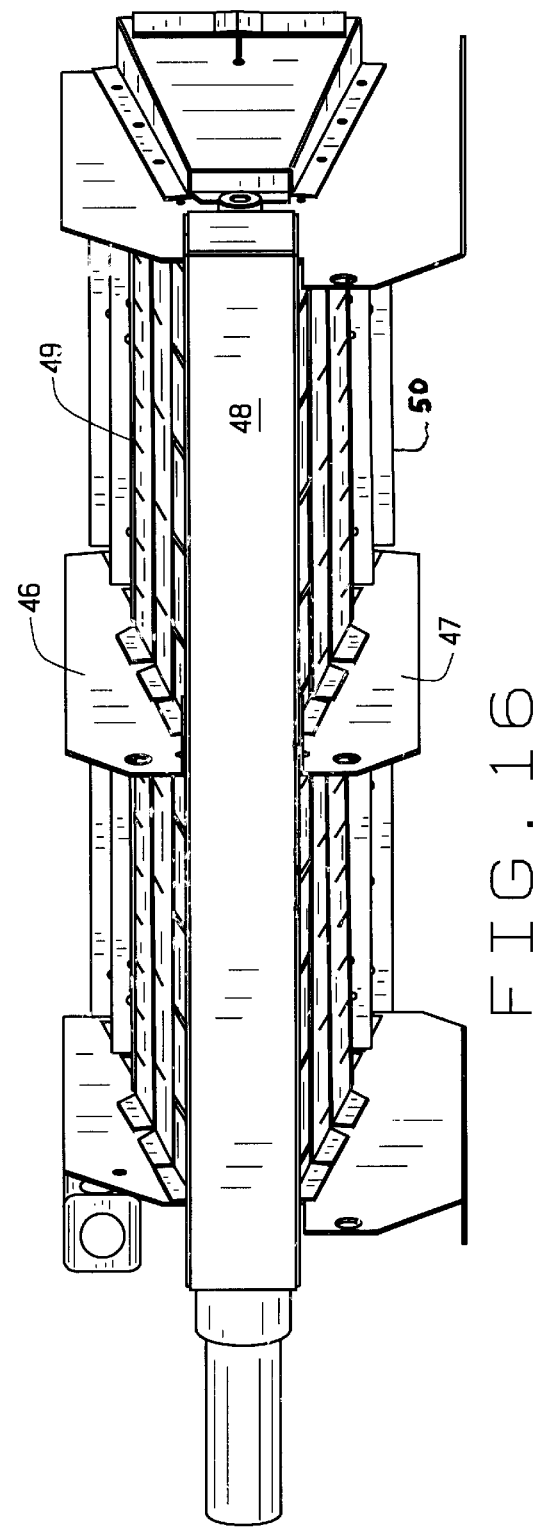
FIG. 16 is a rear isometric view of the burner assembly of FIG. 15.

FIG. 14 discloses what is described as a twenty inch gas burner assembly, as can be seen at 45. It also contains the same components as previously described with respect to FIG. 12, but in this instance, it includes the combination of a pair of 10 inch burners, that are held together by the upper and lower brackets 46 and 47, similar to the brackets as previously described with respect to the burner assembly as explained in FIG. 5. The components of the burner assembly shown herein, with the various slots, compound slots, side slots, and the like, are also similar to that as previously explained with respect to said FIGS. 12 and 13 embodiments, in addition to the FIGS. 6 through 10 embodiments. FIG. 15 furnishes a rear view of the twenty inch gas burner assembly, and shown more clearly the supporting brackets 46 and 47 which are rigidly secured at the top and bottom, respectively, of the gas manifold 48 for furnishing support for the various upper tiered baffles 49 and the lower tiered baffles 50.

Variations or modifications to the subject matter of this development may occur to those skilled in the art upon review of the description as provided herein. Such variations or modifications, if within the spirit of this development, are intended to be encompassed within the scope of the invention as described herein. The description of the preferred embodiment and the illustrations as shown in the drawings are set forth for illustrative purposes only.

What is claimed is:

1. An improved gas burner assembly comprising:

a gas intake manifold;

an upper tiered set of baffles associated with said manifold and a lower tiered set of baffles associated with said manifold, said manifold and said upper tiered set of baffles and said lower tiered set of baffles defining a combustion chamber;

said upper set of tiered baffles including a plurality of tiers of baffles, a first tier of said plurality of baffles being positioned adjacent to said manifold and having a plurality of compound air slots formed therein for the precise control of combustion air to the combustion chamber;

said lower set of tiered baffles also including a plurality of tiers of baffles, a rat first tier of last said plurality of baffles being positioned adjacent said manifold and having a plurality of compound air slots formed therein for a precise control of combustion air to the combustion chamber;

a first side chamber at a first end of the upper and lower tiered set of baffles and a second side chamber at second end of the upper and lower tiered set of baffles, said first and second side chambers disposed to regulate air flow through the combustion chamber.

2. The improved gas burner assembly of claim 1 wherein said first and second side chambers each have an opening formed therein to allow air flow into said first and second side chambers.

3. The improved gas burner assembly of claim 1 wherein each said tier of baffles of said upper and lower tiered set of baffles includes a plurality of discrete slots formed therein for the precise control of combustioned air into the combustioned chamber.

4. The improved gas burner assembly of claim 1 wherein a combustion air flow into the combustion chamber is approximately laminar air flow.

5. The improved gas burner assembly of claim 1 wherein the gas intake manifold has a plurality of gas flow orifices formed therein, said gas flow orifices designed to coordinate gas flow with the controlled combustioned air flow through the compound slots formed in the respective first tiers of the upper and lower tiered set of baffles.

6. The improved gas burner assembly of claim 1 wherein a juncture of the gas intact manifold and the upper and lower tiered sets of baffles is sealed against the unwanted flow of air into the combustion chamber.

7. The improved gas burner assembly of claim 1 further comprising upper and lower air balancing baffles.

8. A direct gas-fired air heater comprising:

a housing;

a motor driven blower within said housing for providing a volumetric airflow through the housing;

a burner assembly within the housing, said burner assembly including a gas intake manifold, an upper tiered set of baffles associated with said manifold and a lower tiered set of baffles associated with said manifold, said manifold and said upper tiered set of baffles and said lower tiered set of baffles defining a combustion chamber, said upper set of tiered baffles including a plurality of tiers of baffles, a first tier of said plurality of baffles being positioned adjacent to said manifold and having a plurality of compound air slots formed therein;

said lower set of tiered baffles also including a plurality of tiers of baffles, a first tier of said plurality of baffles being positioned adjacent said manifold and having a plurality of compound air slots formed therein;

a first air flow chamber formed as a side pocket at a first end of said upper and lower tiered sets of baffles, and a second air flow chamber formed as a second side pocket at a second end of said upper and lower tiered set of baffles, wherein said plurality of tiers of baffles in said respective upper and lower tiered sets of baffles and said respective first and second air flow chambers cooperate for a precise control of combustion air to the combustion chamber.

9. The direct gas-fired air heater of claim 8 wherein the gas intake manifold has a plurality of gas flow orifices formed therein, said gas flow orifices designed to coordinate gas flow into the combustion chamber with the controlled combustion air flow through the compound slots formed in the respective first tiers of the upper and lower tiered set of baffles.

* * * * *